(12) United States Patent
Teo et al.

(10) Patent No.: US 9,461,505 B2
(45) Date of Patent: Oct. 4, 2016

(54) WIRELESS ENERGY TRANSFER WITH NEGATIVE INDEX MATERIAL

(75) Inventors: Koon Hoo Teo, Lexington, MA (US); Da Huang, Durham, NC (US); Bingnan Wang, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1248 days.

(21) Appl. No.: 12/630,498

(22) Filed: Dec. 3, 2009

(65) Prior Publication Data

US 2011/0133564 A1    Jun. 9, 2011

(51) Int. Cl.
*H02J 17/00* (2006.01)
*H04B 5/00* (2006.01)

(52) U.S. Cl.
CPC ............ *H02J 17/00* (2013.01); *H04B 5/0037* (2013.01)

(58) Field of Classification Search
USPC ........................................ 307/104
See application file for complete search history.

(56) References Cited

U.S. PATENT DOCUMENTS

| | | | |
|---|---|---|---|
| 6,661,392 B2 | 12/2003 | Isaacs et al. | |
| 6,859,114 B2 | 2/2005 | Eleftheriades et al. | |
| 6,960,968 B2 | 11/2005 | Odendaal et al. | |
| 7,205,941 B2* | 4/2007 | Wang et al. | 343/700 MS |
| 7,420,445 B2* | 9/2008 | Wyeth et al. | 333/262 |
| 7,561,320 B2* | 7/2009 | Wang et al. | 359/238 |
| 7,629,941 B2* | 12/2009 | Pendry et al. | 343/851 |
| 7,733,289 B2* | 6/2010 | Pendry et al. | 343/851 |
| 7,985,965 B2* | 7/2011 | Barker et al. | 257/22 |
| 7,994,880 B2* | 8/2011 | Chen et al. | 333/219 |
| 8,026,862 B2* | 9/2011 | Pendry et al. | 343/851 |
| 8,031,128 B2* | 10/2011 | Tanielian et al. | 343/795 |
| 8,129,687 B2* | 3/2012 | Fukuyama | 250/368 |
| 2004/0000974 A1 | 1/2004 | Odenaal et al. | |
| 2004/0002835 A1 | 1/2004 | Nelson | |
| 2004/0066251 A1* | 4/2004 | Eleftheriades et al. | 333/117 |
| 2005/0253667 A1* | 11/2005 | Itoh et al. | 333/118 |
| 2006/0181242 A1 | 8/2006 | Freed | |
| 2006/0257090 A1* | 11/2006 | Podolskiy et al. | 385/129 |
| 2007/0115540 A1* | 5/2007 | Bratkovski et al. | 359/342 |
| 2007/0188385 A1* | 8/2007 | Hyde et al. | 343/700 MS |

(Continued)

FOREIGN PATENT DOCUMENTS

| | | |
|---|---|---|
| JP | 2009153095 | 1/2008 |
| WO | 2006011769 A1 | 2/2006 |

(Continued)

OTHER PUBLICATIONS

Eberhard Waffenschmidt, "Qi Coupling Factor", no date available, Wireless Power Consortium. http://www.wirelesspowerconsortium.com/technology/coupling-factor.html.*

(Continued)

*Primary Examiner* — Adi Amrany
(74) *Attorney, Agent, or Firm* — Gene Vinokur; James McAleenan; Hironori Tsukamoto

(57) ABSTRACT

A system exchanges energy wirelessly and includes a structure configured to exchange the energy wirelessly via a coupling of evanescent waves. The structure is non-radiative, and generates an electromagnetic (EM) near-field in response to receiving the energy. A negative index material (NIM) is arranged within the EM near-field such that the coupling is enhanced.

15 Claims, 11 Drawing Sheets

400

(56) References Cited

U.S. PATENT DOCUMENTS

| | | |
|---|---|---|
| 2007/0215843 A1* | 9/2007 | Soukoulis et al. ............ 252/570 |
| 2007/0222542 A1 | 9/2007 | Joannopoulos et al. |
| 2008/0278264 A1 | 11/2008 | Karalis et al. |
| 2009/0015075 A1 | 1/2009 | Cook |
| 2009/0039656 A1 | 2/2009 | Farley |
| 2009/0109103 A1* | 4/2009 | Pendry et al. ................. 343/703 |
| 2009/0153273 A1 | 6/2009 | Chen et al. |
| 2009/0219213 A1* | 9/2009 | Lee et al. ............... 343/700 MS |
| 2009/0303154 A1* | 12/2009 | Grbic et al. .................. 343/909 |
| 2010/0027102 A1* | 2/2010 | Hyde et al. .................. 359/333 |
| 2010/0033701 A1* | 2/2010 | Lee et al. ........................ 355/67 |
| 2010/0117908 A2* | 5/2010 | Lee et al. ............... 343/700 MS |
| 2010/0123530 A1 | 5/2010 | Park et al. |
| 2010/0141042 A1 | 6/2010 | Kesler et al. |
| 2010/0148589 A1* | 6/2010 | Hamam et al. ............... 307/104 |
| 2010/0164296 A1 | 7/2010 | Kurs et al. |
| 2010/0237709 A1 | 9/2010 | Hall |
| 2010/0259108 A1 | 10/2010 | Giler et al. |
| 2010/0264747 A1 | 10/2010 | Hall et al. |
| 2010/0264748 A1 | 10/2010 | Tucker |
| 2010/0277789 A1* | 11/2010 | Wu et al. ....................... 359/276 |
| 2011/0095953 A1* | 4/2011 | Lier ............................... 343/755 |
| 2011/0101788 A1* | 5/2011 | Sun et al. ...................... 307/104 |
| 2011/0127848 A1* | 6/2011 | Ryu et al. ..................... 307/104 |
| 2011/0133565 A1* | 6/2011 | Teo et al. ...................... 307/104 |
| 2011/0133566 A1* | 6/2011 | Teo et al. ...................... 307/104 |
| 2011/0133567 A1* | 6/2011 | Teo et al. ...................... 307/104 |
| 2011/0156486 A1* | 6/2011 | Teo et al. ...................... 307/104 |
| 2011/0156487 A1* | 6/2011 | Teo et al. ...................... 307/104 |
| 2011/0159812 A1* | 6/2011 | Kim et al. .................... 455/41.1 |
| 2011/0169335 A1* | 7/2011 | Teo et al. ...................... 307/104 |
| 2011/0169336 A1* | 7/2011 | Yerazunis et al. ............ 307/104 |
| 2011/0234010 A1* | 9/2011 | Bohori et al. ................. 307/104 |
| 2011/0241438 A1* | 10/2011 | Kim et al. ..................... 307/104 |
| 2011/0241612 A1* | 10/2011 | Ryu et al. ..................... 320/108 |
| 2011/0248570 A1* | 10/2011 | Hong et al. ................... 307/104 |
| 2011/0248571 A1* | 10/2011 | Kim et al. ..................... 307/104 |
| 2011/0266880 A1* | 11/2011 | Kim et al. ..................... 307/104 |
| 2011/0266881 A1* | 11/2011 | Kim et al. ..................... 307/104 |
| 2012/0161539 A1* | 6/2012 | Kim et al. ..................... 307/104 |

FOREIGN PATENT DOCUMENTS

| | | |
|---|---|---|
| WO | 2008038542 A1 | 9/2007 |
| WO | 2008118178 A1 | 2/2008 |
| WO | 2008/144677 | 11/2008 |

OTHER PUBLICATIONS

Soukoulis et al, "Negative-Index Materials: New Frontiers in Optics**", 2006, Advanced Materials, vol. 18, pp. 1941-1952.*

Kipple A D et al. "Application of Double Negative Materials to Increase the Power Radiated by Electrically Small Antennas," IEEE Transactions on Antennas and Propagation IEEE Service Center, Piscataway, NJ U.S., vol. 51, No. 10, Oct. 1, 2003, pp. 2626-2640.

* cited by examiner

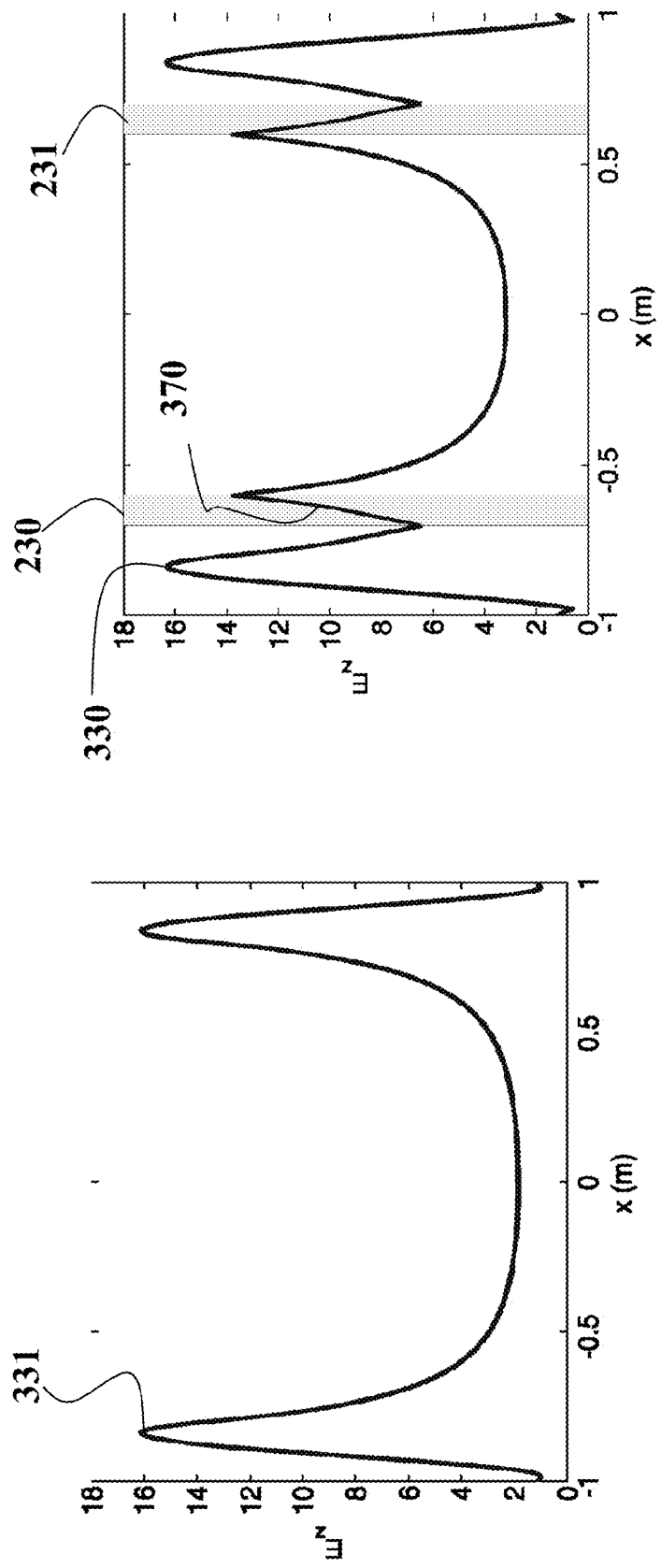

400

500

600

800

| Structure | Even | Odd | Coupling coefficient |
|---|---|---|---|
| Cylinder Only | 7.49595e7 | 7.49717e7 | 3.88e4 |
| Cylinder plus Lossless NIM | 7.49511e7 | 7.497625e7 | 7.60e4 |
| Cylinder plus Lossless NIM pair | 7.5145785e7 | 7.5175227e7 | 14.8e4 |

FIG. 10

WIRELESS ENERGY TRANSFER WITH NEGATIVE INDEX MATERIAL

RELATED APPLICATIONS

This application is co-pending with U.S. patent application Ser. No. 12/630,543 entitled "Wireless Energy Transfer with Negative Index Material," filed by Koon Hoo Teo et al. on Dec. 3, 2009, incorporated herein by reference. This application is co-pending with U.S. patent application Ser. No. 12/630,669 entitled "Wireless Energy Transfer with Negative Index Material," filed by Koon Hoo Teo et al. on Dec. 3, 2009, incorporated herein by reference. This application is co-pending with U.S. patent application Ser. No. 12/630,710 entitled "Wireless Energy Transfer with Negative Index Material" filed by Koon Hoo Teo et al. on Dec. 3, 2009, incorporated herein by reference.

FIELD OF THE INVENTION

The present invention relates to transferring energy, and more particularly, to transferring energy wirelessly.

BACKGROUND OF THE INVENTION

Wireless Energy Transfer

Inductive coupling is used in a number of wireless energy transfer applications such as charging a cordless electronic toothbrush or hybrid vehicle batteries. In coupled inductors, such as transformers, a source, e.g., primary coil, generates energy as an electromagnetic field, and a sink, e.g., a secondary coil, subtends that field such that the energy passing through the sink is optimized, e.g., is as similar as possible to the energy of the source. To optimize the energy, a distance between the source and the sink should be as small as possible, because over greater distances the induction method is highly ineffective.

Resonant Coupling System

In resonant coupling, two resonant electromagnetic objects, i.e., the source and the sink, interact with each other under resonance conditions. The resonant coupling transfers energy from the source to the sink over a mid-range distance, e.g., a fraction of the resonant frequency wavelength.

FIG. 1 shows a conventional resonant coupling system 100 for transferring energy from a resonant source 110 to a resonant sink 120. The general principle of operation of the system 100 is similar to inductive coupling. A driver 140 inputs the energy into the resonant source to form an oscillating electromagnetic field 115. The excited electromagnetic field attenuates at a rate with respect to the excitation signal frequency at driver or self resonant frequency of source and sink for a resonant system. However, if the resonant sink absorbs more energy than is lost during each cycle, then most of the energy is transferred to the sink. Operating the resonant source and the resonant sink at the same resonant frequency ensures that the resonant sink has low impedance at that frequency, and that the energy is optimally absorbed. Example of the resonant coupling system is disclosed in U.S. Patent Applications 2008/0278264 and 2007/0222542, incorporated herein by reference.

The energy is transferred, over a distance D, between resonant objects, e.g., the resonant source having a size $L_1$ and the resonant sink having a size $L_2$. The driver connects a power provider to the source, and the resonant sink is connected to a power consuming device, e.g., a resistive load 150. Energy is supplied by the driver to the resonant source, transferred wirelessly and non-radiatively from the resonant source to the resonant sink, and consumed by the load. The wireless non-radiative energy transfer is performed using the field 115, e.g., the electromagnetic field or an acoustic field of the resonant system. For simplicity of this specification, the field 115 is an electromagnetic field. During the coupling of the resonant objects, evanescent waves 130 are propagated between the resonant source and the resonant sink.

Coupling Enhancement

According to coupled-mode theory, strength of the coupling is represented by a coupling coefficient k. The coupling enhancement is denoted by an increase of an absolute value of the coupling coefficient k. Based on the coupling mode theory, the resonant frequency of the resonant coupling system is partitioned into multiple frequencies. For example, in two objects resonance compiling systems, two resonant frequencies can be observed, named even and odd mode frequencies, due to the coupling effect. The coupling coefficient of two objects resonant system formed by two exactly same resonant structures is calculated by partitioning of the even and odd modes according to $$\kappa = \pi |f_{even} - f_{odd}| \qquad (1)$$

It is a challenge to enhance the coupling. For example, to optimize the coupling, resonant objects with a high quality factor are selected Accordingly, it is desired to optimize wireless energy transfer between the source and the sink.

SUMMARY OF THE INVENTION

Embodiments of the invention are based on the realization that evanescent wave coupling is enhanced by arranging one or more pieces of negative refractive index material along the path of the evanescent wave coupling between the source and the sink.

Embodiments of the invention disclose a system configured to exchange energy wirelessly. The system includes a structure configured to exchange the energy wirelessly via a coupling of evanescent waves, wherein the structure is electromagnetic (EM) and non-radiative, and wherein the structure generates an EM near-field in response to receiving the energy; and a negative index material (NIM) arranged within the EM near-field such that the coupling is enhanced.

BRIEF DESCRIPTION OF THE DRAWINGS

FIG. 10 is a table comparing an efficiency of energy transfer as a function of frequency with and without the NIM;

DETAILED DESCRIPTION OF THE PREFERRED EMBODIMENTS

Embodiments of the invention are based on a realization that a negative index material (NIM) arranged in an electromagnetic (EM) near-field on a path of an evanescent wave while energy is transferred wirelessly, increases amplitude of the evanescent wave and, thus, optimizes the efficiency of the energy transfer.

Figure 1:
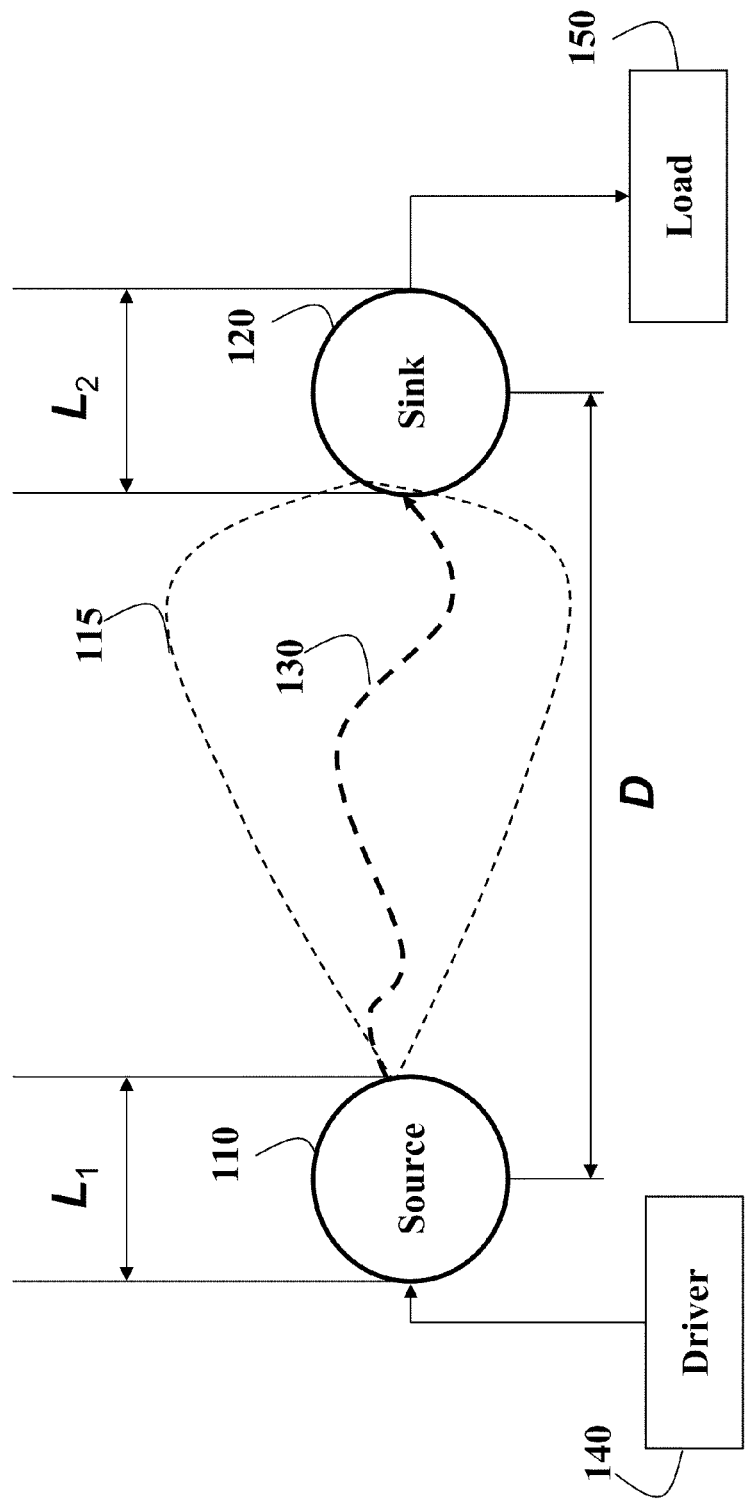
FIG. 1 is a block diagram of a conventional resonant coupling system.
Figure 2:
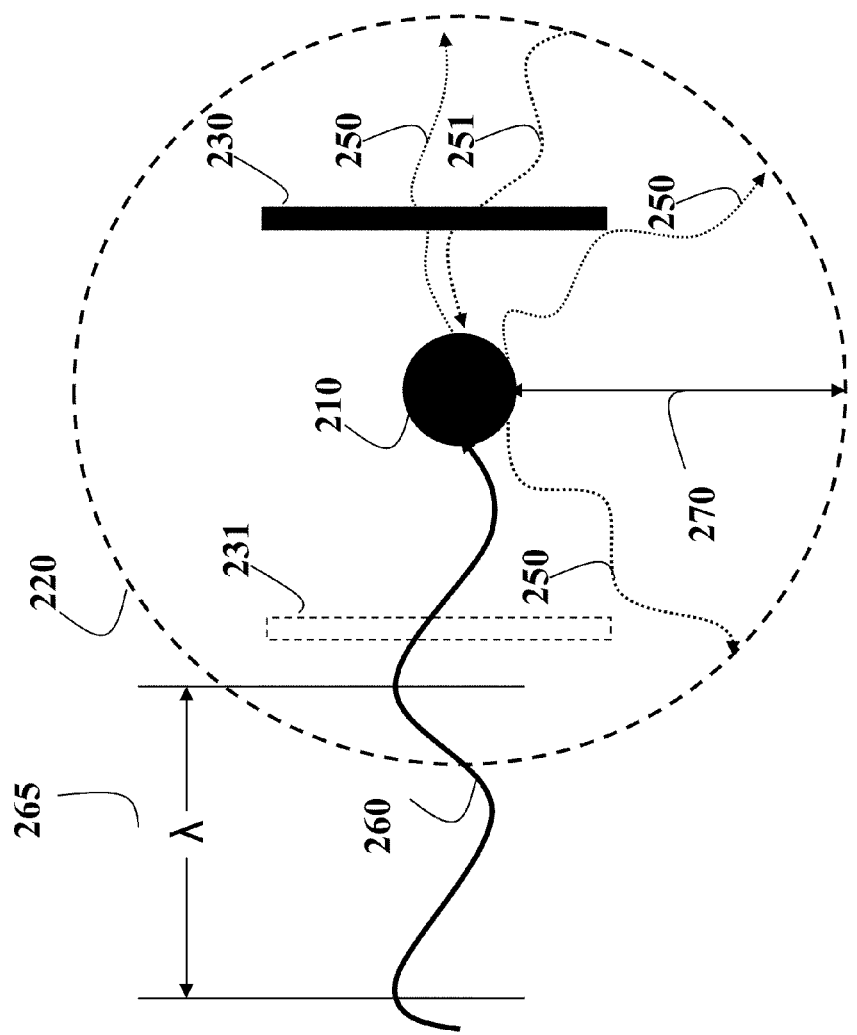
FIG. 2 is an example of a system suitable to transfer or receive energy wirelessly.

FIG. 2 shows a system 200 according an embodiment of the invention. The system is configured to exchange, e.g., transmit or receive, energy wirelessly and includes an electromagnetic (EM) non-radiative structure 210 configured to generate an electromagnetic near-field 220 when the energy is received by the structure and exchange the energy wirelessly via a coupling of evanescent waves.

In one embodiment, the energy 260 is supplied by a driver (not shown) as known in the art. In this embodiment, the structure 210 serves as a source of the wireless energy transfer system. In alternative embodiment, the energy 260 is supplied wirelessly from the source (not shown). In that embodiment, the structure 210 serves as a sink of the wireless energy transfer system.

The system 200 further includes a negative index material (NIM) 230 arranged within the near-field 220. The NIM is a material with negative permittivity and negative permeability properties. Several unusual phenomena are known for this material, e.g., evanescent wave amplification, surface plasmoni-like behavior and negative refraction. Embodiments of the invention appreciated and utilized the unusual ability of NIM to amplify evanescent waves, which optimizes wireless energy transfer.

When the energy 260 is received by the structure 210, the EM near-field is generated in substantially all directions around the EM structure. The near-field is contrasted with far-field. Within the near-field, the shape and dimensions of the near-field depends on a frequency of the external energy 260, and on a resonant frequency of the EM structure 210, determined in part by a shape of the EM structure, e.g., circular, helical, cylindrical shape, and parameters of a material of the EM structure such as conductivity, relative permittivity, and relative permeability.

Usually, a range 270 of the near-field is in an order of a dominant wavelength of the system. In non resonant systems, the dominant wavelength is determined by a frequency of the external energy 260, i.e., the wavelength $\lambda$ 265. In resonant systems, the dominant wavelength is determined by a resonant frequency of the EM structure. In general, the dominant wavelength is determined by the frequency of the wirelessly exchanged energy.

The resonance is characterized by a quality factor (Q-factor), i.e., a dimensionless ratio of stored energy to dissipated energy. Because the objective of the system 200 is to transfer or to receive the energy wirelessly, the frequency of the driver or the resonant frequency is selected such as to increase the dimensions of the near-field region. In some embodiments, the frequency of the energy 260 and/or the resonant frequency is in diapason from MHz to GHz. In other embodiments, aforementioned frequencies are in the light domain.

Evanescent Wave

An evanescent wave is a near-field standing wave with an intensity that exhibits exponential decay with distance from a boundary at which the wave is formed. The evanescent waves 250 are formed at the boundary between the structure 210 and other "media" with different properties in respect of wave motion, e.g., air. The evanescent waves are formed when the external energy is received by the EM structure and are most intense within one-third of a wavelength of the near field from the surface of the EM structure 210.

It is to be understood, that number of different configurations of the system 200 are possible in addition to the embodiments described below. For example, in one embodiment, the system 200 is a sink configured to receive the energy wirelessly from the source. In another embodiment, the system 200 is the source configured to transmit energy wirelessly to the sink. In yet another embodiment, the system 200 is the source configured to transfer energy concurrently to multiple sinks.

In some embodiments, during the operation of the system 200, the structure 210 regardless of being either the source or the sink, receives evanescent waves 251 concurrently with emitting the evanescent waves. The NIM 230 is arranged on a path of at least one evanescent wave 250 or 251. If a desired direction of the energy to be transferred or the energy to be received is known, then the NIM is arranged optimally, e.g., NIM 230 or NIM 231, based on the desired direction of the energy exchange.

In other embodiments, multiple NIMs are optimally arranged on the path of the evanescent waves to maximize the amplitude of the waves.

Figure 3A:
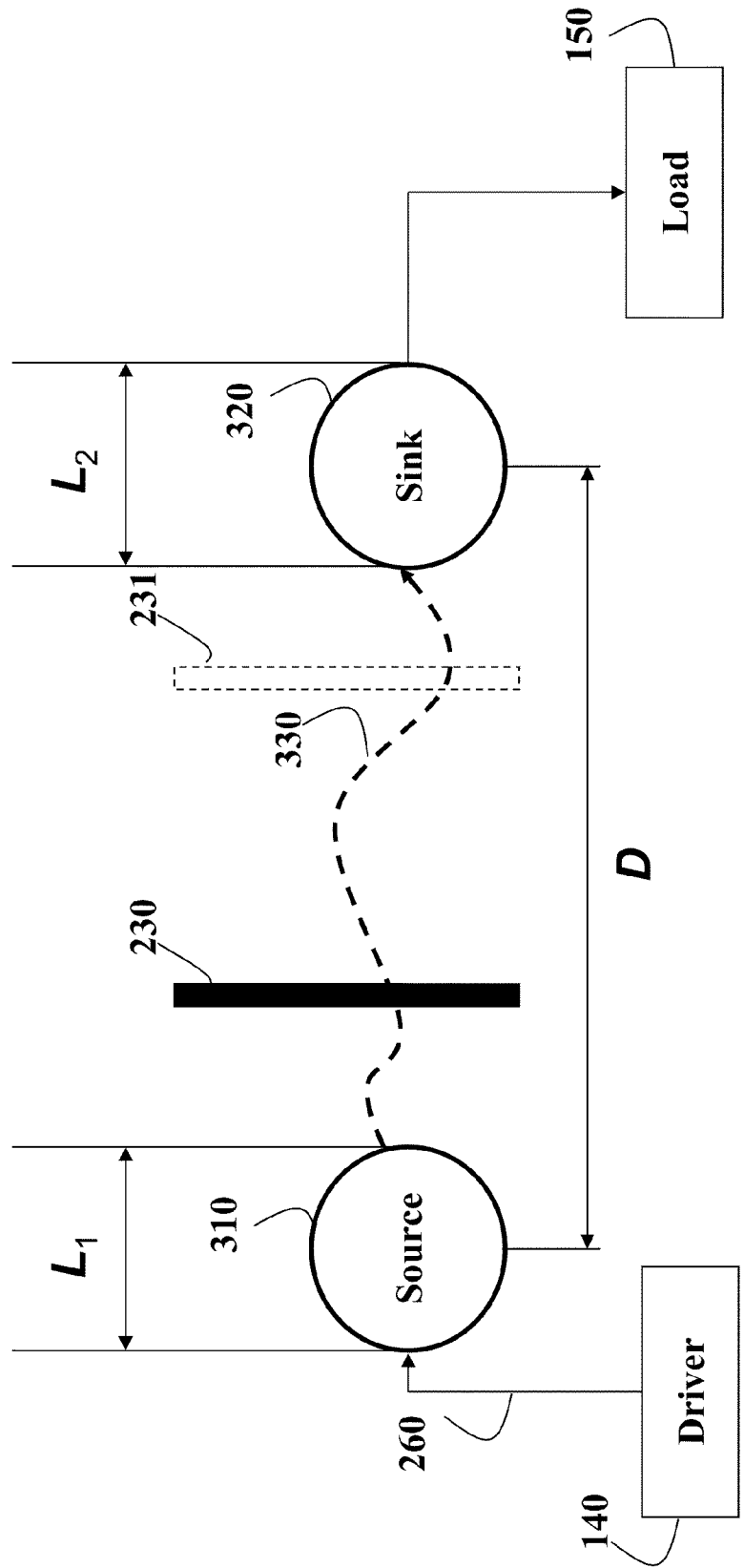
FIG. 3-6 are block diagrams of different embodiments of the invention.

FIG. 3A shows a system 300 according to another embodiment of the invention. The system 300 is a resonant coupling system and includes at least one NIM 230 arranged within the near-field of the source 310 on the path of the evanescent wave 330. The energy 260 is provided to the system 300 by the driver 140, transmitted wirelessly by the source 310 via the evanescent wave 330 to the sink 320 and consumed by the load 150. In one embodiment, the load includes a processer.

In one variation of the system 300, the NIM 230 is arranged nearer to the source than to the sink 320. In another variation, the NIM 231 is arranged nearer to the sink than to the source. In yet another variation, multiple NIMs 230-231 are arranged on the path of the evanescent wave 330, such that the evanescent wave travels through each NIM in the plurality of NIMs during the coupling. In general, the NIM is arranged such that to optimize evanescent waves coupling between the source and the sink during the wireless energy transfer. In one embodiment, the NIM is arranged such that the distance between the NIM and the structure is proportional to the dimensions of the NIM. Typically, the smaller the dimensions of the NIM, the closer the NIM is arranged to the to the EM structure.

Evanescent Wave Coupling

Evanescent wave coupling is a process by which electromagnetic waves are transmitted from one medium to another by means of the evanescent, exponentially decaying electromagnetic field.

Coupling is usually accomplished by placing two or more electromagnetic elements, i.e., the source and the sink, at some distance D to each other such that the evanescent waves generated by the source does not decay much before reaching the sink. If the sink supports modes of the appropriate frequency, the evanescent field gives rise to propagating wave modes, thereby connecting (or coupling) the wave from one waveguide to the next.

Evanescent wave coupling is fundamentally identical to near field coupling in electromagnetic field theory. Depending on the impedance of the radiating source element, the evanescent wave is either predominantly electric (capacitive) or magnetic (inductive), unlike in the far field where these components of the wave eventually reach the ratio of the impedance of free space and the wave propagates radiatively. The evanescent wave coupling takes place in the non-radiative field near each medium and as such is always associated with matter, i.e. with the induced currents and charges within a partially reflecting surface.

FIGS. 3B-3C show evanescent waves coupling with or without the NIM respectively. When the energy is supplied to the source, the near field is created. Radiation loss and dielectric loss consume part of the energy, but if the radiation is not strong, most of the energy is reflected back to the source. However, when the sink is arranged sufficiently close to the source, i.e., at the distance D apart from the source, the evanescent waves 331 and/or 330 are coupled between the source and the sink, such that the energy is transferred from the source to the sink. As shown in FIG. 3B, without the NIM, the energy is transferred through the coupling of the evanescent waves of the source and the sink.

However, when the NIM is arranged in the near field created by the source and/or the sink during the coupling of the source and the sink, amplitude of the evanescent wave is increased 370 when the wave is traveling through the NIM, as shown in FIG. 3C. Thus, the evanescent wave coupling is enhanced and the energy is transferred more efficiently and/or the distance D between the source and the sink is increased.

Figure 4:
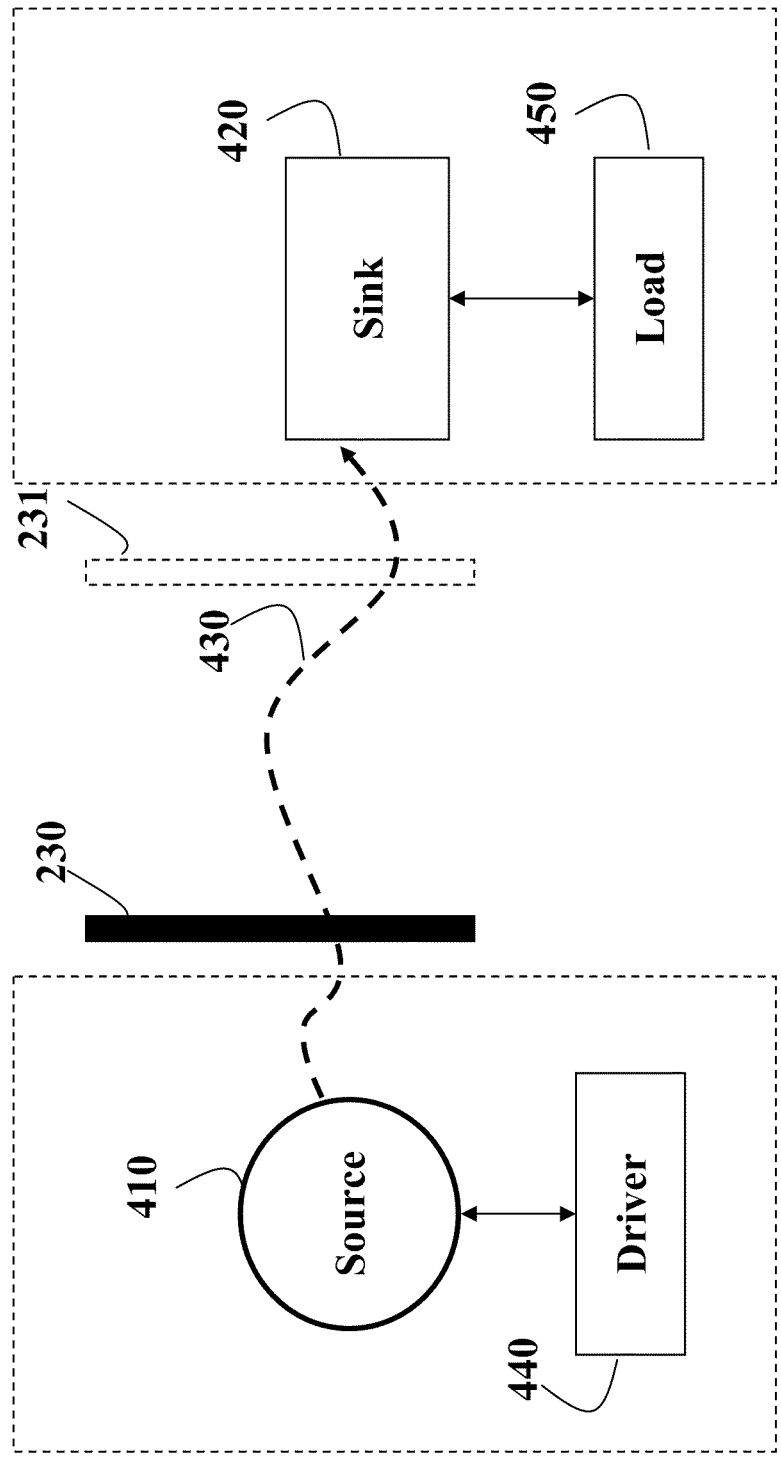

FIG. 4 shows a system 400 according to another embodiment of the invention. The system 400 is a non-resonant system. The non-resonant system, in contrast with the resonant system, is designed such that the source 410 and the sink 420 have different resonant frequencies. For example, in one variation of the system 400, both the source and the sink are resonant structures having different resonant frequencies. In another variation, the sink 420 is a non-resonant structure, e.g., the load 450. In another variation, the source 410 is a non-resonant structure, e.g., the driver 440.

Figure 5:
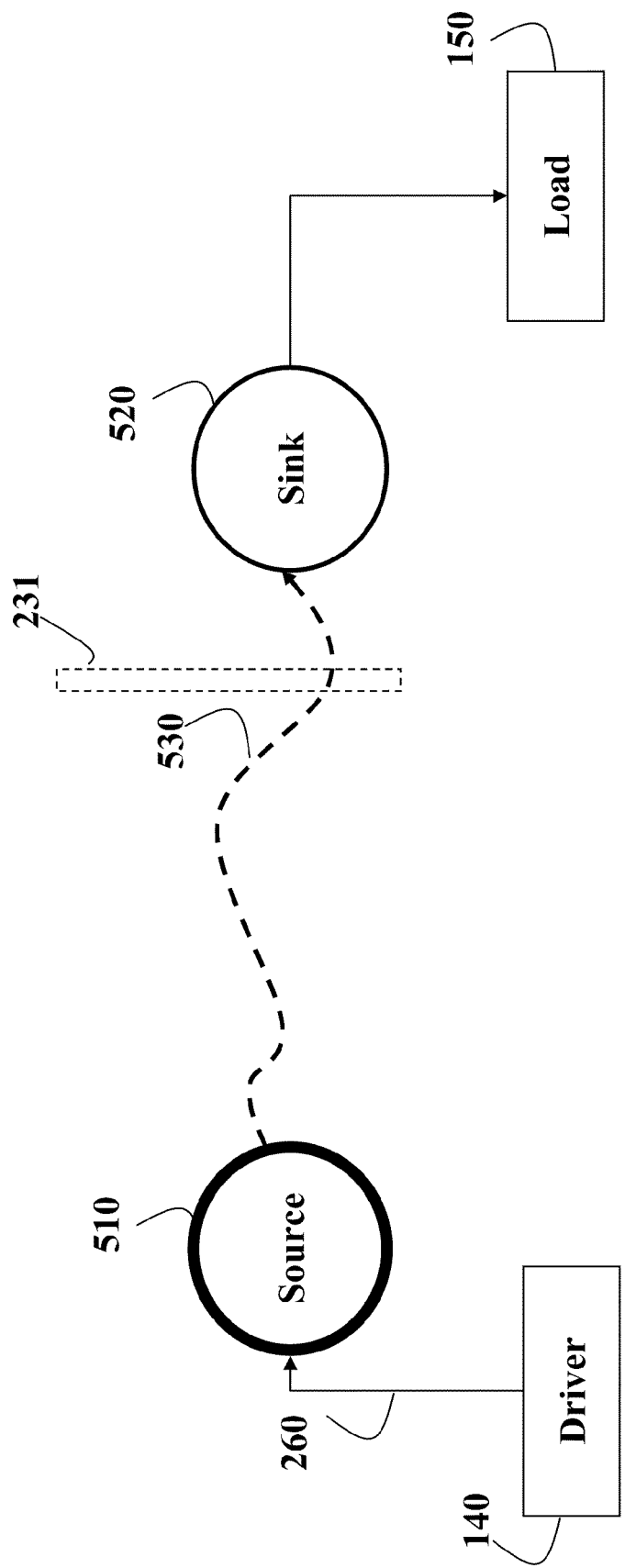

FIG. 5 shows a system 500 according to yet another embodiment of the invention. In this embodiment, the material of the EM structure itself includes the NIM. For example, in one variation of this embodiment, the source 510 is made of the NIM. In other variations, the sink 520 and/or both the sink and the source are made of the NIM. In different variations, the source and the sink are made of the same or different NIMs. In yet another variation of embodiment, a second NIM 231 is positioned on the path of the evanescent wave 530 in addition to the NIM included in the EM structures.

Figure 6:
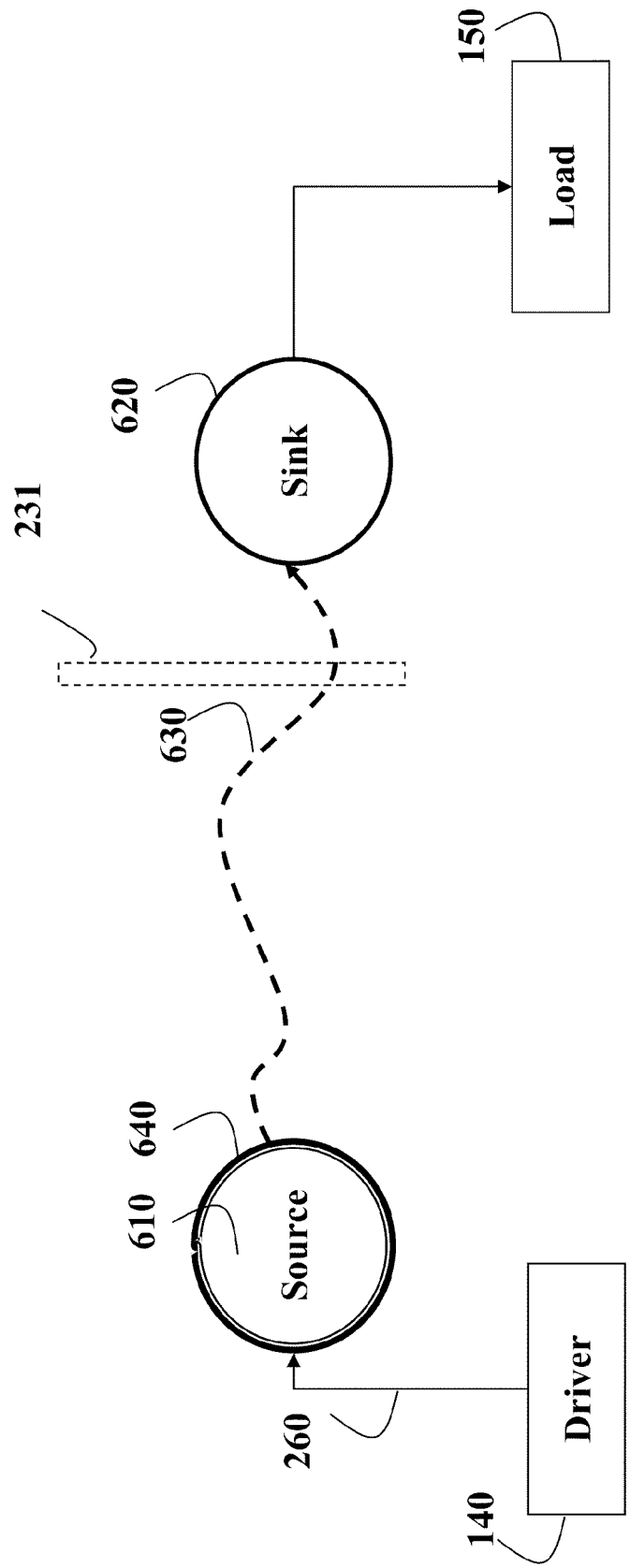

FIG. 6 shows a system 600 according to yet another embodiment of the invention. In this embodiment, the NIM 640 substantially encloses the EM structure 610. For example, in one variation of this embodiment, the source 610 has a cylindrical shape, and the NIM has similar cylindrical shape with slightly greater diameter. In other variations, the sink 620 and/or both the sink and the source are enclosed by the NIM. In another variation of embodiment, a second NIM 231 is positioned on the path of the evanescent wave 630 in addition to the NIM 640. This embodiment is particularly advantageous in applications with multiple directions of the energy exchange, or wherein the direction is not known in advance.

Table of FIG. 10 shows coupling coefficients calculated for different wireless energy transfer system. The coupling coefficient is a measure of the strength of coupling between two EM structures, and quantifies a rate at which energy transfer occurs between those EM structures. Based on the FIG. 6, it is clear that the embodiments of the invention increase the coupling coefficient and thus increase the efficiency of the systems. For example, a single block of the NIM increases the coupling coefficient in one system from 3.88e4 to 7.6e4. Two blocks of the NIM further increase the coupling coefficient to 14.8e4.

Embodiments of the invention can be used in variety of applications, systems and devices, which require wireless energy transfer, e.g., in a car, a mobile communicator, a laptop, an audio/video device.

Figure 7:
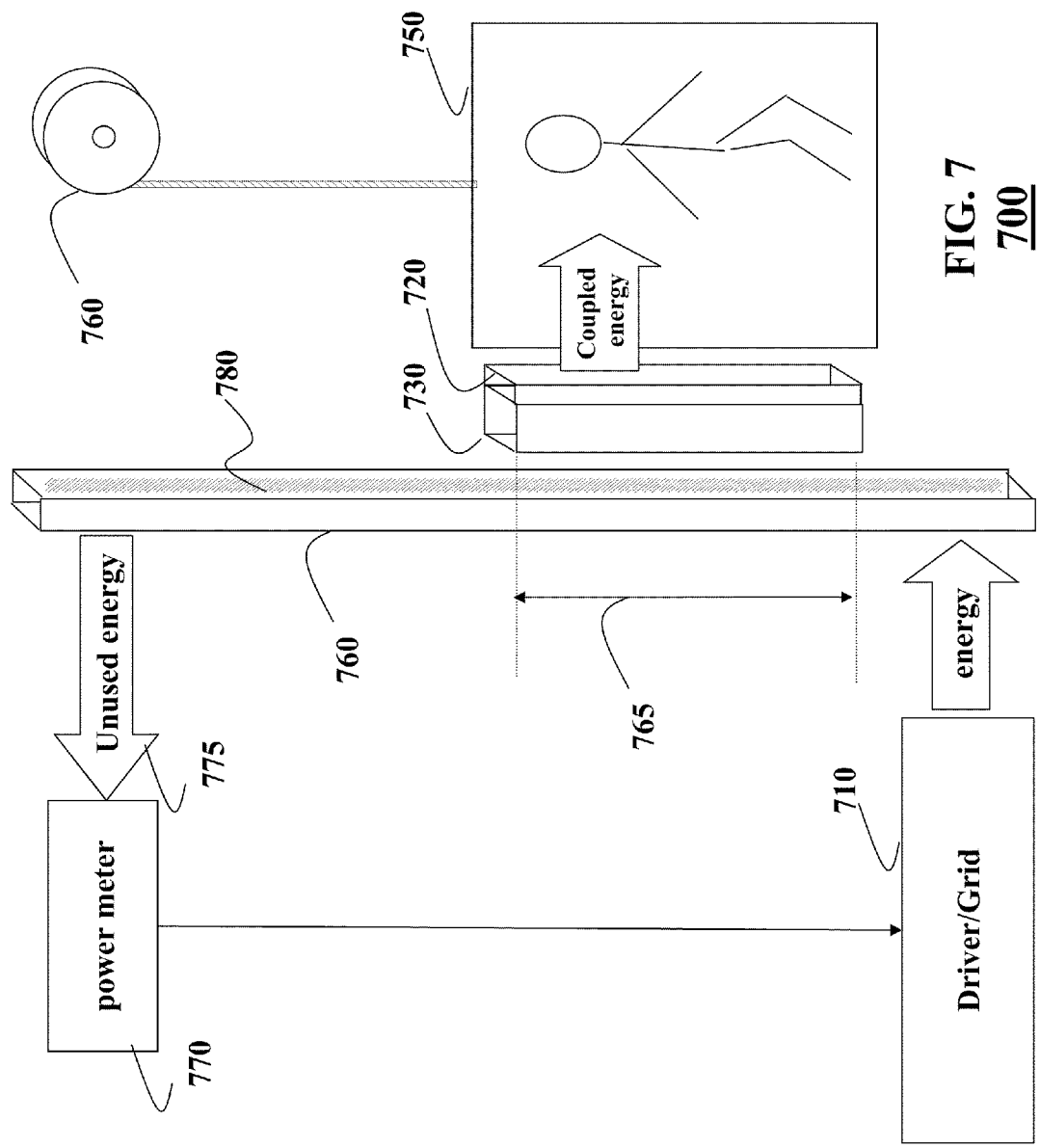
FIG. 7 is an example of a system for supplying energy wirelessly to moving devises.

FIG. 7 shows a system 700 for supplying energy wirelessly to moving devices, such as elevator cars and electric vehicles. In one embodiment, a cable-less elevator car 750, i.e., the load, is connected to an antenna 720, i.e., the sink, configured to receive the energy wirelessly from a waveguide 760. The waveguide is installed at a hoistway and receives energy from a driver 720. The driver can be connected to a power grid and supply energy to the waveguide, e.g., inductively. The waveguide is configured to generate electromagnetic evanescent waves. For example, in one embodiment, the waveguide is implemented via a conductive wire. In another embodiment, one side of the waveguide includes has perforations or slots 780 to allow evanescent waves to exist on a surface of the waveguide.

The NIM 730 is arranged between the sink and the waveguide, e.g., affixed to the antenna 720, such that when the antenna is moved, the NIM is moved dependently. The NIM is positioned such that the evanescent waves emitted from an energy transfer area 765 of the waveguide reaches the antenna through the NIM. When the cage is moved by a pulling mechanism 760, the energy transfer area is adjusted accordingly.

The antenna 720 and the NIM 730 form the system 200. When connected to devices having at least one degree of freedom, such as an elevator cage, an electric car, and a cell phone, the system 200 allows the devices to receive energy wirelessly yet efficiently.

Negative Index Material (NIM)

NIM is an artificial material with negative permittivity $\epsilon$ and negative permeability $\mu$ properties. The evanescent wave between the source and the sink is amplified while propagating through the NIM, which optimized energy transfer.

In some embodiments, the NIM used in the system has electromagnetic properties as $\epsilon=-1$, $\mu=-1$. When the evanescent wave propagates through the NIM, impedance of the NIM is matched with free space impedance, no reflection occurs at the interface of NIM and free space, which is critical for power transmission, and the evanescent wave is amplified through NIM.

In other embodiments, the NIM has negative values of permittivity $\epsilon$ and permeability $\mu$ properties, not exactly $-1$. In those embodiments, surface plasmons are excited on an interface between the NIM and other media such as air, gas or vacuum while accumulating energy and EM field intensity. The NIM usually comes with material loss, partly from the dielectric loss, and partly from dispersive loss. The loss decreases the evanescent wave amplification during propagation through the NIM. However, the surface wave is excited and energy is accumulated at the interface between the NIM and other media. This property extends the evanescent wave propagation and optimizes the energy coupling between the source and the sink.

There are number of different methods to design the NIM. For example, split ring resonator (SRR) with metal wire structure is one example of an artificial material design of the NIM. SRR and an inductive-capacitive (LC) resonator is another example of the NIM design. Embodiments of the invention use any type of NIM that meets the objective of evanescent wave enhancement. In one embodiment, the system is a resonant one, and the NIM has a refractive index equals to $-1$ at the resonant frequency of the system.

Figure 8:
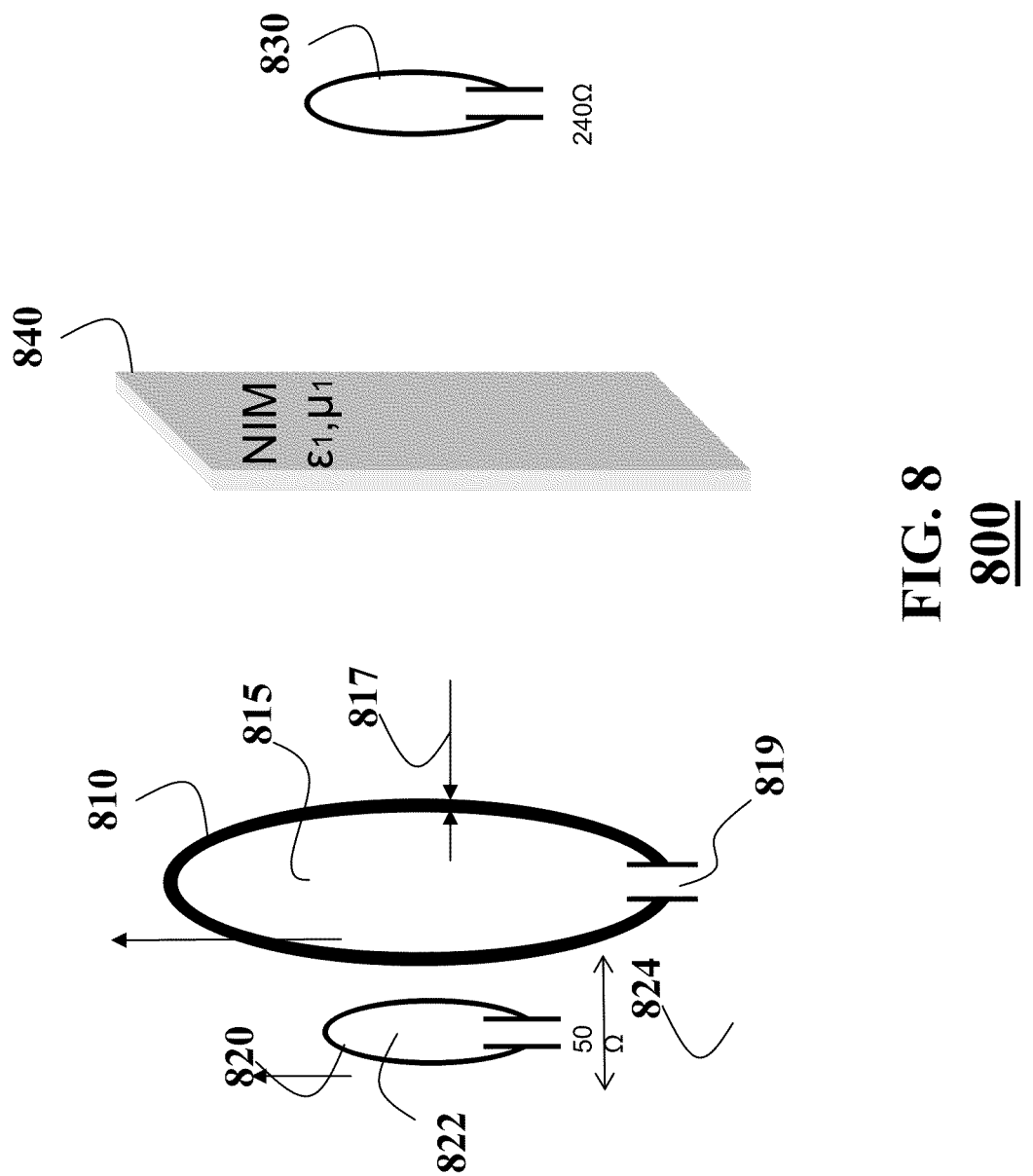
FIG. 8 shows an example of application of NIM in a capacitance loaded loop resonant system 800 resonating at about 8 MHz.

FIG. 8 shows an example of application of NIM in a capacitance loaded loop resonant system 800 resonating at about 8 MHz. A capacitance loaded loop 810 serves as the source of the system 800. The capacitance loaded loop has a radius 815 of 30 cm, and copper wire cross section radius 817 of 2 cm and capacitance dielectric disk area 819 of 138 cm$^2$, with the permittivity property $\epsilon$=10. The energy is confined in the near range of LC loop in the format of evanescent wave.

A metal loop structure 820 with load 50 of Ohm is the driver of the system. Similarly, a metal loop 830 with load 240 Ohm is the load of the system. The NIM 840 is arranged between the source and the load in the near-field of the source. Radii 822 of the driver and the load are 20 cm. The driver is arranged at a distance of 20 cm from the source 824, and the driver is inductively coupled with the source.

The arrangement of the NIM in the near-field depends on a design of the driver and the load, especially where the impedance at the driver and load needs to be modified to achieve maximum power transfer efficiency.

In order to get the maximum coupling enhancement, a physical cross sectional size, thickness, and the position of NIM with respect to the energy transfer field needs to be optimized, according to configuration of the elements of the system, e.g., the source, the sink, the driver, and the load and the environment the system is located in. In one embodiment optimization is accomplished through computer modeling or experimentally to enable best impedance matching to allow maximum power transfer.

Figure 9:
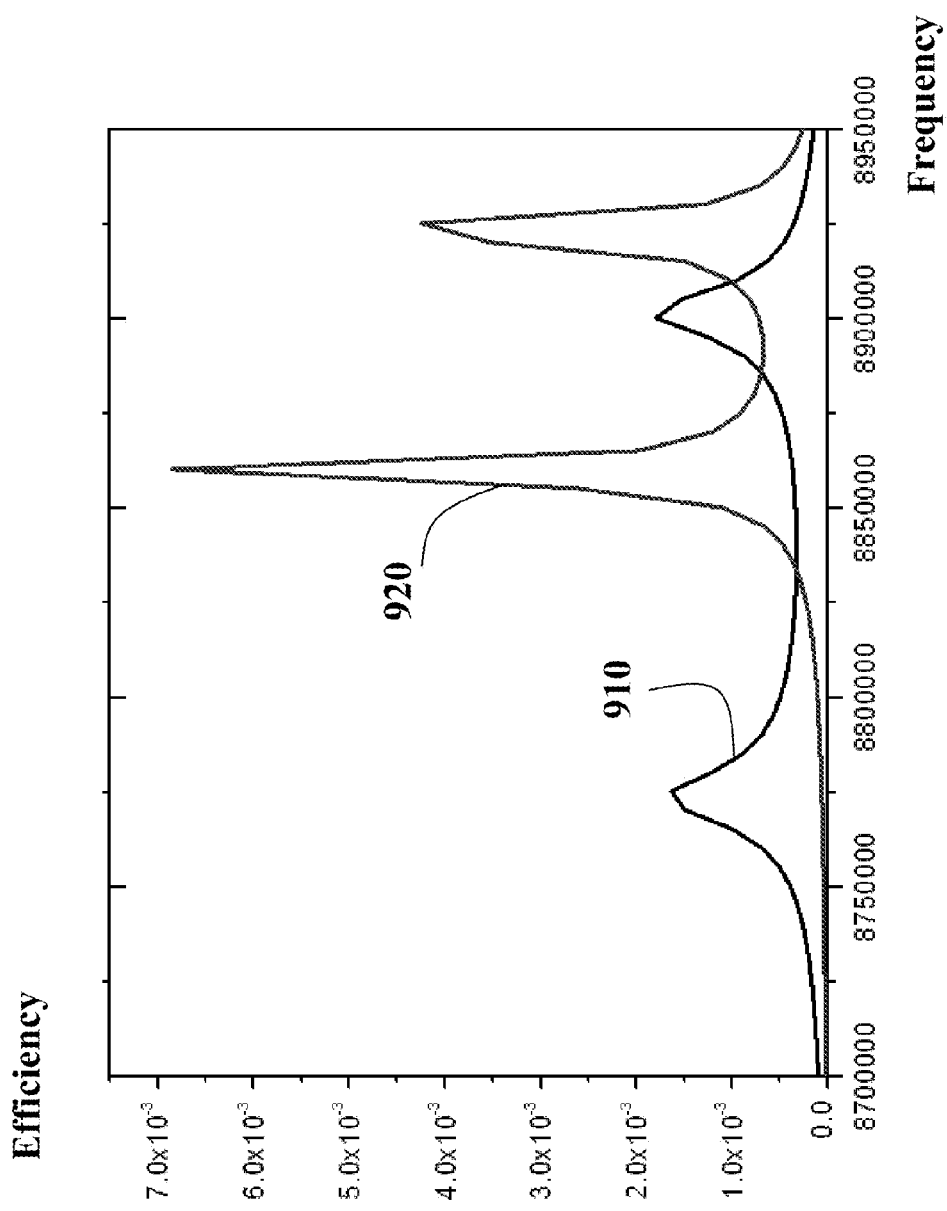
FIG. 9 is a graph comparing an efficiency of energy transfer as a function of frequency with and without the NIM.

FIG. 9 is a graph comparing of an efficiency of energy transfer as a function of frequency with and without the NIM. As shown, the efficiency of the systems, which includes the NIM 920, is more than three times greater the efficiency 910 of the corresponding systems without the NIM.

NIM material with exact electromagnetic properties occurs only at single frequency, which means the exact material properties $\epsilon$=−1, $\mu$=−1 only occurs at one frequency, such as f=8 MHz. However, the NIM displays the negative electromagnetic properties in bandwidth of about 5-10% of the resonant frequency. In systems wherein the NIM is designed to work at 10 MHz, about 0.5 MHz to 1 MHz bandwidth is achieved around 10 MHz for the permittivity and the permeability to be negative. In this bandwidth, NIM is utilized in wireless power transfer system to enhance coupling and power transfer efficiency, if the negative EM properties frequency range of the NIM covers the resonant component resonance frequency point.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system configured to exchange energy wirelessly, comprising:
    a source structure and a sink structure exchanging the energy wirelessly via a coupling of evanescent waves, wherein the source structure and the sink structure are non-radiative and generate an electromagnetic (EM) near-field during the exchanging of the energy, wherein a strength of the coupling is represented by a coupling coefficient, and wherein the source structure and the sink structure are resonant structures, such that the system is a resonant system with a resonant frequency; and
    a negative index material (NIM) arranged within the EM near-field to increase the coupling coefficient, wherein the NIM is a resonant structure and has negative electromagnetic properties at the resonant frequency.

2. The system of claim 1, further comprising:
    a driver supplying the energy to the source structure.

3. The system of claim 1, further comprising:
    a load receiving the energy from the sink structure.

4. The system of claim 1, wherein the energy has a frequency in a diapason from MHz to GHz.

5. The system of claim 1, wherein the NIM is arranged optimally based on a desired direction of the energy transfer.

6. The system of claim 1, wherein the NIM is arranged such as to enclose at least one of the source structure or the sink structure.

7. The system of claim 1, wherein a plurality of NIMs arranged on a path of an evanescent wave such that the evanescent wave travels through each NIM in the plurality of NIMs during the coupling.

8. The system of claim 1, wherein the NIM is arranged such that a distance between the NIM and at least one of the source structure or the sink structure is proportional to dimensions of the NIM.

9. A method for exchanging energy wirelessly via a coupling of evanescent waves, wherein a strength of the coupling is represented by a coupling coefficient, comprising:
    providing a structure for exchanging the energy wirelessly via the coupling, wherein the Structure is non-radiative and resonant at a resonant frequency, and wherein the structure generates the evanescent waves in response to receiving the energy; and
    increasing the coupling coefficient using a negative index material (NIM) arranged on a path of the coupled evanescent waves, wherein the NIM has negative electromagnetic properties at the resonant frequency.

10. The method of claim 9, wherein the structure is a source configured to transfer the energy to a sink, further comprising:
    supplying the energy to the structure.

11. The method of claim 9, wherein the energy is supplied inductively.

12. The method of claim 9, wherein the structure is a sink configured to receive the energy wirelessly, further comprising:
    supplying the energy to a load.

13. The method of claim 9, further comprising:
    arranging a plurality of NIMs on the path of the coupled evanescent waves.

14. A system configured to exchange energy wirelessly, comprising:
    a source structure and a sink structure exchanging the energy wirelessly via a coupling of evanescent waves, wherein the source structure is an electromagnetic (EM) and a non-radiative; and
    a negative index material (NIM) arranged on a path of the coupled evanescent waves, such that the NIM increases a coupling coefficient of the coupling, wherein the source structure is a resonant structure having a resonant frequency, and the NIM has a negative permittivity property and a negative permeability property within a bandwidth of about 5-10% of the resonant frequency.

15. The system of claim 14, wherein the NIM is arranged such as to enclose the source structure.

* * * * *